United States Patent [19]

Mulholland et al.

[11] Patent Number: 5,073,042
[45] Date of Patent: Dec. 17, 1991

[54] COUPLING BUSHING FOR VARIOUS TYPES OF OPTICAL FIBER CONNECTORS

[75] Inventors: Denis G. Mulholland, Lancaster; Ronald R. Schaffer; Gary N. Warner, both of Harrisburg, all of Pa.

[73] Assignee: AMP Incorporated, Harrisburg, Pa.

[21] Appl. No.: 558,932

[22] Filed: Jul. 27, 1990

Related U.S. Application Data

[63] Continuation-in-part of Ser. No. 541,675, Jun. 21, 1990, Pat. No. 5,042,891.

[51] Int. Cl.5 .............................................. G02B 6/36
[52] U.S. Cl. ....................................... 385/69; 385/56; 385/86
[58] Field of Search ................... 350/96.2, 96.21, 96.22

[56] References Cited

U.S. PATENT DOCUMENTS

| 4,478,485 | 10/1984 | Khoe et al. | 350/96.2 |
| 4,597,631 | 7/1986 | Flores | 350/96.2 |
| 4,715,675 | 12/1987 | Kevern et al. | 350/96.2 |
| 4,834,487 | 5/1989 | Abendschein et al. | 350/96.2 |

FOREIGN PATENT DOCUMENTS

| 2516662 | 7/1976 | Fed. Rep. of Germany | 350/96.21 |
| 61-147209 | 7/1986 | Japan | 350/96.21 |
| 60-218932 | 4/1987 | Japan | |
| 63-109407 | 5/1988 | Japan | 350/96.2 |
| 62-26141 | 8/1988 | Japan | |
| 63-253313 | 10/1988 | Japan | 350/96.2 |

Primary Examiner—John D. Lee
Assistant Examiner—John Ngo

[57] ABSTRACT

A coupling bushing 1 for optical fiber connectors comprises a first half structure 1A comprising a base 14 having an axial bore 16 and a socket 15 extending from tlhe rear 21 of the base 14. The socket 15 has a bore 16 axially aligned with the bore of the base 14 to form an extension thereof. The socket 15 is adapted to receive an alignment ferrule of the optical fiber connector. The half structure 1A further comprises, at its front face 20, a pattern of ridges 24 and slots 25 forming keying and aligning feature for intermating with complementary feature of another connecting base. Further, the half structure 1A includes at least one recess 23 and at least one nub 22 forming aligning features for intermating with complementary features of another connecting base. The half structure 1A further comprises a barrel-shaped coupling body 17 extending from the rear face 21 of the base 14 and encompassing the socket 15 within its interior 18. The interior 18 of the coupling body 17, is adapted to receive an end of the optical fiber connector.

12 Claims, 8 Drawing Sheets

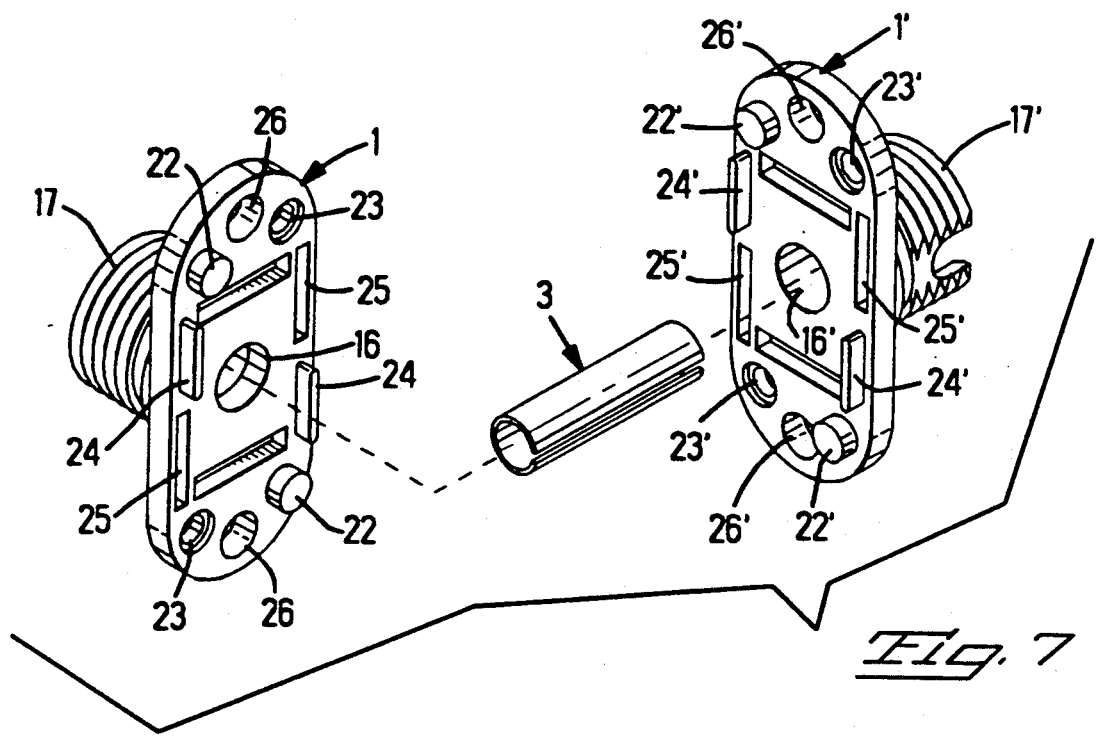
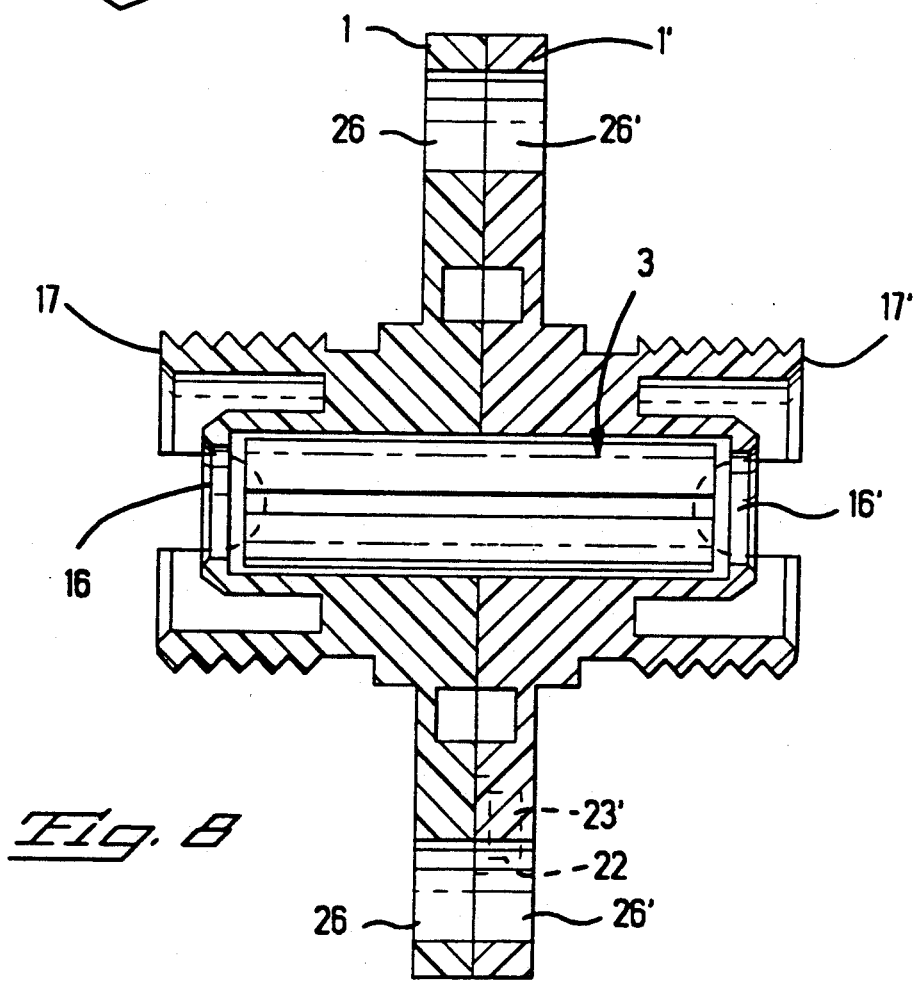

5,073,042

COUPLING BUSHING FOR VARIOUS TYPES OF OPTICAL FIBER CONNECTORS

FIELD OF THE INVENTION

This application is a continuation-in-part of pending application Ser. No. 07/541,675 filed June 21, 1990 has been allowed, U.S. Pat. No. 5,042,891. The present invention relates to the coupling of various types of optical fiber connectors.

BACKGROUND OF THE INVENTION

A variety of fiber optic connectors is known. For example, Gerace et al., U.S. patent application 450,330, filed Dec. 13, 1989, still pending relates to a threaded type of connector having a shell encircling a spring biased holder for the optical fiber. Strength members of the fiber cable are anchored to the shell, permitting the combination of the holder and optical fiber to be reciprocatable with respect to the shell. Further included may be an alignment ferrule and a sheath to facilitate injection of an adhesive during bonding of the fiber. This threaded type of connector may be utilizable as part of a push-pull type of connector such as that disclosed in Mulholland et al., U.S. patent application 491,755, filed Mar. 9, 1990, still pending.

Another fiber optic connector is the bayonet type exemplified by Abendschein et al., U.S. Pat. No. 4,834,487. This connector includes an alignment ferrule, a collar surrounding the ferrule, and a coupling nut moveable axially over the ferrule whereby the collar may be retracted to compress a spring.

It would be advantageous to intermate these various types of connectors, one to the other. An object of the present invention is to provide a coupling body which permits threaded types of connectors to be coupled, one to the other, or the connection of a threaded connector to a bayonet type connector, or a bayonet type connector to another bayonet type connector, or permits the interconnection of push-pull type connectors or the connection of a push-pull type connector with threaded type or bayonet type. A particular aspect of the present invention is a keying feature which permits polarized intermating between two of many different types of optical fiber connectors.

SUMMARY OF THE INVENTION

The present invention relates to a coupling bushing for optical fiber connectors wherein the connectors have central passageway, alignment ferrule, and further include an optical fiber. Each half structure of the coupling bushing comprises a base having profiled axial bore. The half structure also has a socket extending from a rear face of the base and having a bore axially aligned with the bore of the base to form an extension thereof. The socket is adapted to receive an alignment ferrule of the optical fiber connector. Further, the base is characterized, at its front face, by a pattern of ridges and slots. The ridges and slots form a keying feature for the intermating with complementary keying feature of another connecting base. Further, the base has at least one recess and at least one nub forming aligning features for intermating with complementary features of the other connecting base.

The coupling bushing half structure may further comprise a barrel-shaped coupling body extending from a rear face of the base and encompassing the socket within its interior which is adapted to receive an end of the optical fiber connector. In one embodiment, the barrel-shaped housing is threaded at its outer surface for intermating with a threaded type of optical fiber connector. In another embodiment, the barrel-shaped housing has latching nub and slot for intermating with a bayonet type of optical fiber connector.

In yet a third embodiment, the half structure of the coupling bushing further may include a receptacle housing having a receptacle therein. The receptacle has two catch pieces of cantilever form extending from the base parallel to and on opposing sides of the longitudinal axis of the socket of the base and terminates in protrusions and lip structures for intermating with a push-pull type of optical fiber connector.

The present invention is also directed to an coupling bushing comprising a first half structure of a coupling bushing and a second half structure of another coupling bushing. Each structure may be a threaded connector type bushing, a bayonet connector type, a push-pull connector type bushing, or the bushing may comprise combinations of the different types of half structures. The first and second structures of the bushing are intermated one to the other, front face to front face, by complementary fit of the pattern of ridges and slots of the first half of the coupling bushing to the pattern of ridges and slots of the second half of the coupling bushing. Further the first and second halves of the bushing may be intermated by complementary fit of at least one nub of one coupling half to the at least one recess of the other half of the coupling bushing.

Further included within the present invention is a duplex coupling bushing. In this embodiment, the coupling bushing comprises a half structure comprising a base having duplex profiled axial bores, and duplex sockets each extending from the rear of the base and each having bore axially aligned with a respective bore of the base to form an extension thereof. Each socket is adapted to receive an alignment ferrule of the optical fiber connector. The half structure further comprises, at its front face, a pattern of ridges and slots forming a keying feature for intermating with complementary feature of another connecting base, and at least one recess and at least one nub forming aligning features for intermating with complementary features of another connecting base.

BRIEF DESCRIPTION OF THE DRAWINGS

FIG. 5 is a perspective view of the bayonet connector intermated with the coupling bushing of FIG. 3.

FIG. 7 is a partially exploded view of a coupling bushing for threaded connectors.

FIG. 8 is a view in section of the intermated coupling bushing of FIG. 7.

DESCRIPTION OF PREFERRED EMBODIMENT

Figure 1:
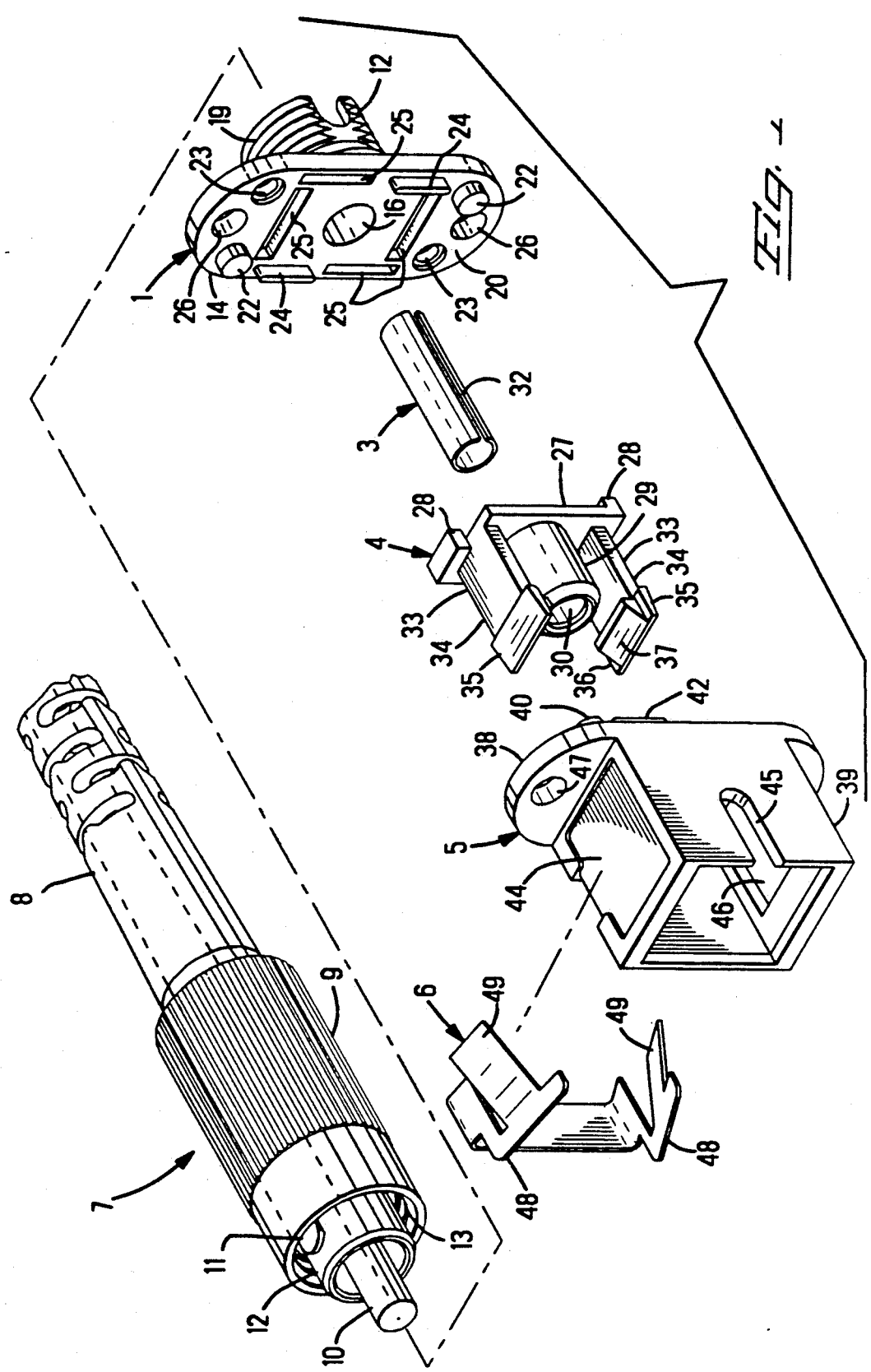
FIG. 1 is a perspective view, partially exploded, of a threaded connector with coupling bushing, the bushing adapted for to a push-pull type optical fiber connector.
Figure 2:
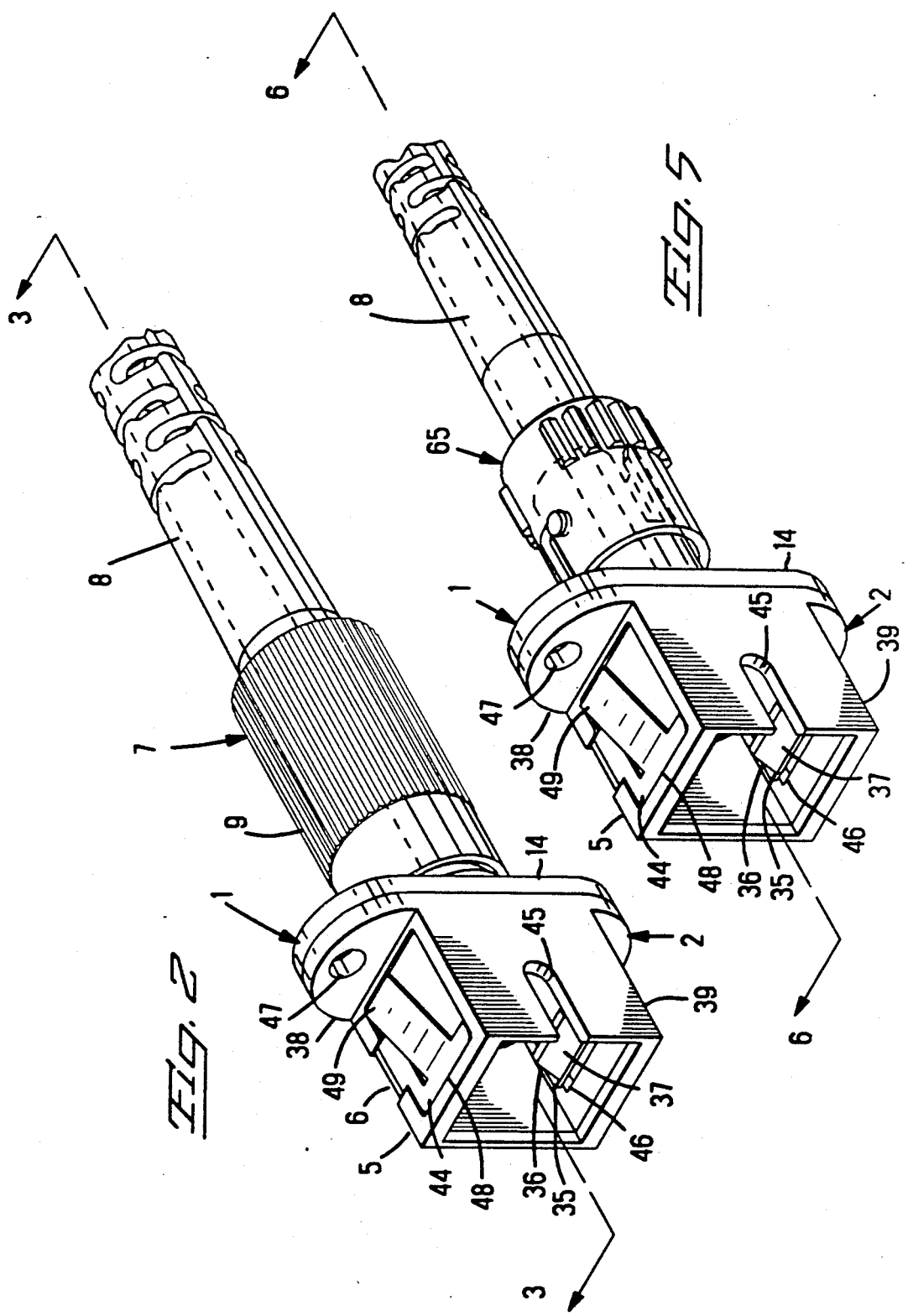
FIG. 2 is a perspective view of the threaded connector intermated with the coupling bushing of FIG. 1.
Figure 3:
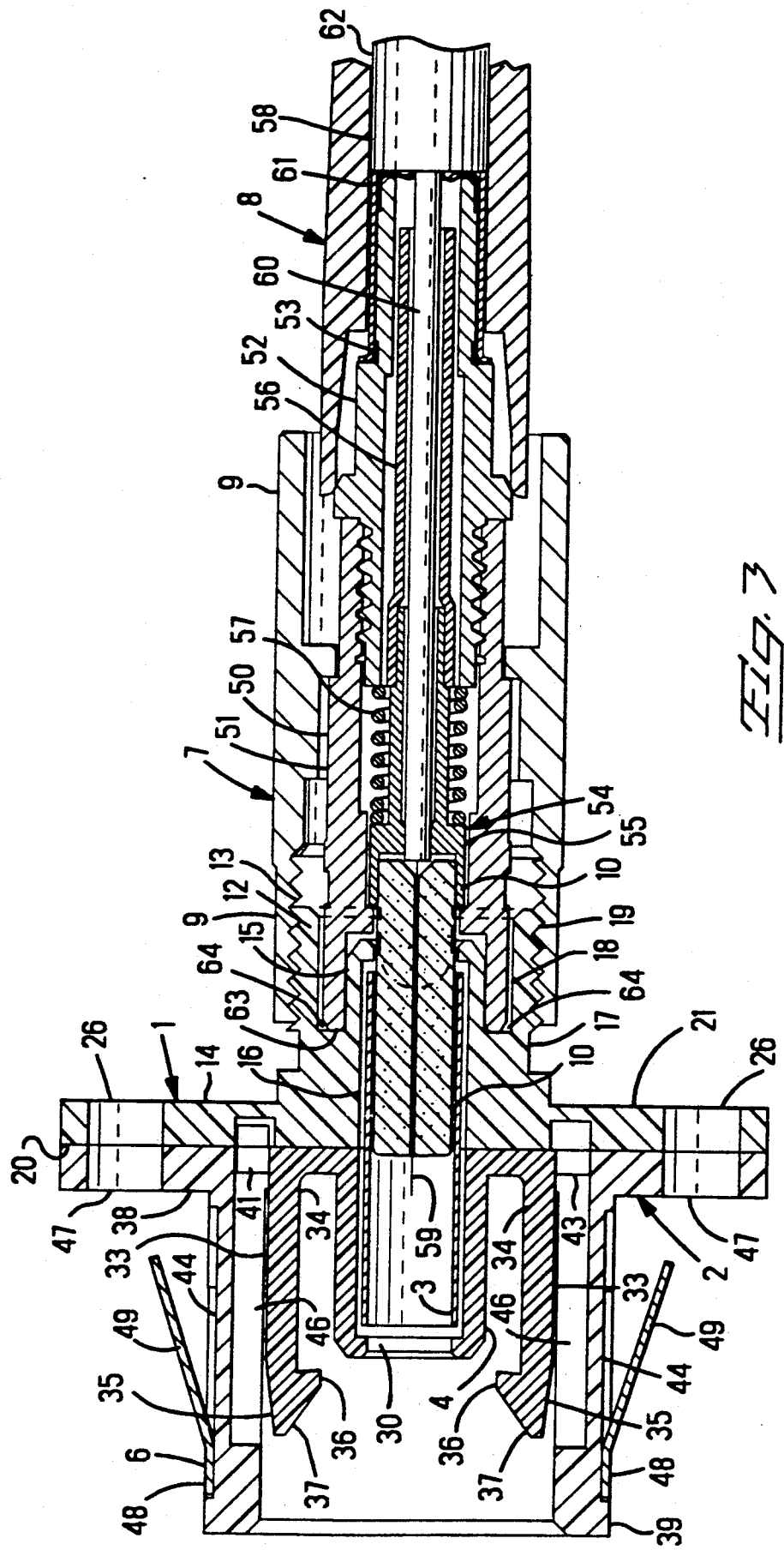
FIG. 3 is a view in section of the threaded connector mated with the coupling bushing as shown in FIG. 2.

Referring to FIGS. 1, 2 and 3, shown is the coupling bushing 1 of the present invention having a half structure 1A and another half section, which is part of what is indicated as adapter assembly 2, which includes slotted sleeve 3, receptacle 4, receptacle housing 5 and clip 6. Threaded connector 7 is shown in combination with a strain relief boot 8. Also shown as part of the threaded connector 7 is coupling ring 9, alignment ferrule 10, polarizing ring 11, metal shell 12, with threading 13.

The half structure 1A of the coupling bushing 1 comprises base 14 having inner socket 15 with axially extending bore 16, which bore 16 forms a continuous passageway through both the body of the socket 15 and base 14. Further, as part of the half structure 1A is barrel-shaped coupling body 17, extending from base 14, and encompassing, within its interior 18, socket 15. Coupling body 17 is outwardly threaded at its outer surface 19 for connection by threading to the threaded connector 7 as hereinafter described. The base 14 of the half 1A has forward face 20 and rearward face 21. The said socket 15 and coupling body 17 extend rearward from rearward face 21 of the base 14 while forward face 20 is characterized by two sets of nubs 22 and recesses 23. The nubs 22 and recesses 23 are shaped to complement one another for fit, one to the other, for example, as when the base 14 intermates with another element, such as the receptacle housing 5, having nubs and recesses for complementary fit thereto. As shown, the nubs 22 are positioned so as to act as aligning and orienting features for intermating with the complementary features of another connecting base having complementary recesses and nubs.

Further, the base 14 is characterized by ridges 24 and slots 25 in a sequence around the periphery of a rectangular pattern. The particular sequence of ridges and slots, forming a rectangular pattern, provides a feature for aligned and oriented intermating with complementary features of another connecting base, along with the nubs 22 and recesses 23. Ports 26 are provided for securing the coupling bushing 1 to a housing or the like by means of a bolt or rivet or the like. Openings 26 need not be ports but could be slots or other shaped openings as well.

Adapter assembly 2 has receptacle 4 which includes a base 27, substantially rectangular in shape, with rearward extending flanges 28 that are horizontally disposed across approximately one-half of the horizontal perimeter of each base, for fit to within horizontal slots 25 of the base 14. The receptacle 4 further includes socket 29 with axial bore 30 When adapter assembly 2 is intermated with the other half of coupling bushing 1, socket 29 of receptacle 4 extending forward, in combination with socket 15 of the other half of the coupling bushing 1 extending rearward, forms a continuous supporting structure for intermating with the threaded connector 7 as hereinafter described. Further, axial bore 30 of socket 29, in combination with bore 16 of socket 15, forms a continuous passageway for access by a part of a mated threaded connector 7, again as hereinafter described. Slotted sleeve 3 fits within both the axial bore 30 of socket 39 and the bore 16 of socket 15 to form a continuous passageway through the bore 31 of the said sleeve 3. The sleeve 3 fits loosely within bore 16 and bore 30, and has slot 32 to permit compressing of the sleeve to the alignment ferrule 10 when the connector 7 is inserted within the bore 30 and bore 16. The receptacle 4 provides means for connecting the threaded connector 7 through the coupling bushing 1 to another element such as a connector of the push-pull type, and the connection is provided by the combination of the socket 29 and resilient catch pieces 33. The resilient catch pieces 33 extend from base 27 and are in the form of cantilever arms extending parallel to and on opposing sides of the longitudinal axis of the socket 29. The cantilever pieces 30 have tab sections 34, protrusions 35 and lip structures 36. In the embodiment shown, a single surface 37 of lip 36 is beveled, however in another embodiment, lip 36 would have side bevels to facilitate lead-in as the receptacle is interconnected, in combination with the coupling bushing 1, to another element such as the plug housing of a push-pull connector.

Receptacle housing 5 has base 38 and forward extending box-like section 39. Base 38 is complementary to the base 14 in that it is characterized by nubs 40 which fit to recesses 23 of base 14, by recesses 41 which fit to nubs 22 of base 14, by ridges 42 which fit complementarily and provide an orientation with complementary slots 25, and slots 43, which receive ridges 24 of the first section 1A. Forward extending structure 39 is characterized by inset planes 44 at the outside top and bottom of the structure 39, and key slot 45 to the side. Within the interior of the box-like structure 39, at top and bottom, are spacings 46 which accommodate the deflections of protrusions 35 during an intermating with a push-pull type of connector. Finally, the receptacle housing 5 has ports 47 for the accepting of a securing bolt or the like, commonly through both ports 47 and ports 26 of the coupling bushing 1 for attachment to another element.

Clip 6 has biasing extensions 48, top and bottom, which fit around the top and the bottom of the forward extending box-like structure 39 of the receptacle housing 5, and which seat to the planes 44. Wings 49 of cantilever form extend up from the top and down from the bottom of the clip to provide a fitting feature to other elements or to a housing or bulkhead.

With particular reference to FIG. 2, threaded connector 7 includes, metal shell 50 comprised of a front shell portion 51 and a rear shell portion 52, and a crimp ferrule 53. Further included is a holder 54 for an optical fiber. The holder 4 includes the ceramic alignment ferrule 10 and a metal body 55. Further included, as part of threaded connector 7, is a sheath 56, a biasing spring 57 of coil form, and the internally threaded coupling ring 9.

Further in FIG. 2, is shown optical fiber cable 58. The cable 58 includes an elongated central optical fiber 59 concentrically encircled by buffer 60 together comprising a buffer covered fiber. The cable 58 further includes strength members 61 which act as load bearing portions and which extend lengthwise of the cable 58. The strength members 61 are distributed over the outer diameter of the buffer covered fiber 60, 59. The cable 58 further includes an outer jacket 62 of polymeric material enclosing the strength members 61. Parts of the cable 58 are cut away to provide a length of fiber 59 projecting from the buffer 60 and a length of buffer covered fiber 60, 59 projecting from the strength members 61, and lengths of strength members 61 projecting from the jacket 62. The strength members 61 are captivated by the fit of crimp ferrule 53 to the rear portion 52 of the inner shell 50 so that the buffer covered fiber 60,59 is slidable within the jacket 62 and within the surrounding strength members 61. Further details of the construction of the threaded connector 7 and the assembly of the connector 7 to the optical fiber cable 58 are disclosed by Gerace et al., Pending U.S. application 450,330, filed Dec. 13, 1989, still pending which disclosure is herein incorporated by reference.

The bushing 1 is assembled by the first step of inserting slotted sleeve 3 to within the bore 16 through base 14 to within socket 15 of the first half structure 1A of bushing 1. Socket 29 of receptacle 4 is then fitted over and to encompass a portion of the slotted sleeve 3 extending from the bore 16. The slotted sleeve 3 is loosely accommodated within the continuous axial bore 30 and 16 formed by the fit of receptacle 4 to the front face 20 of bushing 1. Receptacle 4 is secured to the base 14 of the first half structure 1A by the fit of flanges 28 within the complementary slots 25 of the half 1A and within the perimeter defined by extending ridges 24 and slots 25. Thereafter the receptacle 4 is secured to the forward face 20 of the half 1A bushing 1 by fitting receptacle housing 5 to the first half section 1A with nubs 40 of the housing 5 fitting to complementary recesses 23 of the first half structure 1A and nubs 22 of the half 1A fitting within complementary recesses 41 of the housing 5. Further, ridges 42 of the housing 5 fit within slots 25 of half structure 1A, and ridges 24 of the half structure 1A fit within the slots 43 of the housing 5. The first structure 1A and the adapter assembly 2, which is a second half structure, form the coupling bushing 1. The bushing 1 may be subjected to ultrasonics or to other means to make permanent the connection provided by the complementary nubs 40, recesses 23, nubs 22, recesses 41, ridges 42, slots 25, ridges 24 and slots 43. The now axially aligned ports 47 of the housing 5 and ports 26 of the first structure 1A provide a common passageway for the receiving of a securing means for attachment to another element such as a bulkhead or the like. The combination of the sleeve 3, receptacle housing 5 and receptacle 4 as a second half structure, secured to the first half structure 1A, forms a cooperating mechanism, coupling bushing 1, for intermating a threaded type connector with a push-pull type of connector.

Clip 6 may be attached to and seated around the body of receptacle housing 5 to further provide a cooperating connecting mechanism for mating with the push-pull connector whereby the clip 6 provides a panel lock mechanism. The biasing extensions 48 are seated into the upper and lower recessed planes 44 of the housing 5 and held thereto by spring force fit. In this position, wings 49 extend outward from the body of the housing 5 to provide a clip for attachment to within a port in a housing or panel or the like.

Threaded connector is connected to the bushing 1 by inserting, from back to front, the ceramic alignment ferrule 10 of the connector 7, along with the end of the optical fiber 59, into the bore 31 of the sleeve 3 within socket 15. Sleeve 3 receives the ceramic ferrule of connector 7, and the slot of the sleeve permits expansion and compression fit to the ferrule within the bore 16 of the socket 15 and base 14. Annular front flange 63 of front portion of 51 of shell 50 of connector 7 nestles within the annular recess 64, formed between outer barrel-shaped coupled body 17 and inner socket 15 of the connector 7. Keying slot 84 in the rear portion of the barrel of body 17 accepts keying feature 80 of the threaded connector 7, and coupling ring 9 of the connector 7 is advanced forward and the threading 13 of the ring 9 threaded to the threading 19 of the coupling body 17 of bushing 1 to secure the connector 7 to bushing 1. Both the push-pull connector and the mating of the push-pull connector to bushings of the type of this patent application are disclosed by Mulholland et al, U.S. patent application 491,755, filed Mar. 9, 1990, still pending and this disclosure is incorporated herein by reference.

Figure 4:
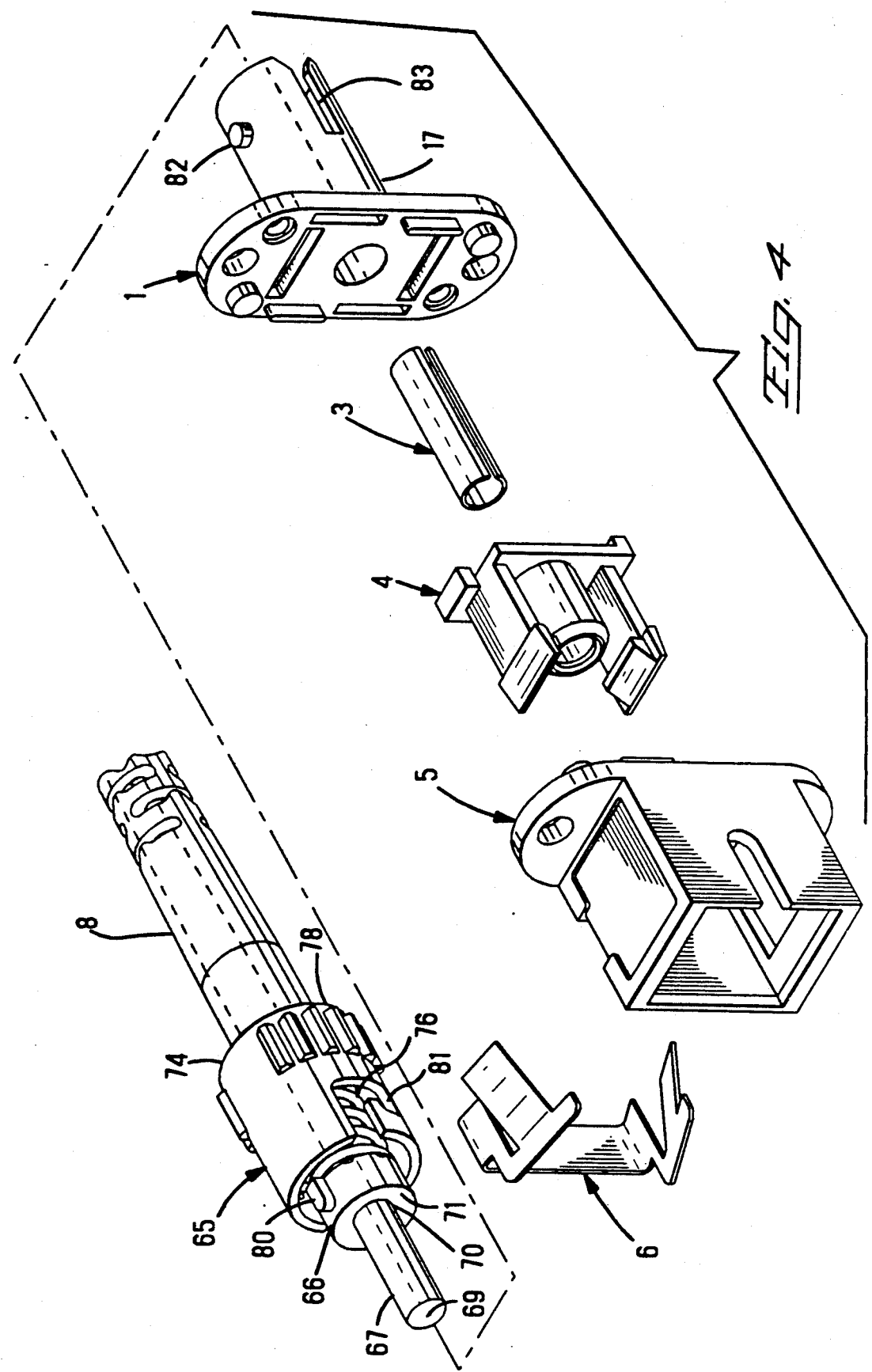
FIG. 4 is a perspective view, partially exploded, of a bayonet connector and coupling bushing for interconnecting the bayonet connector with a push-pull type connector.
Figure 6:
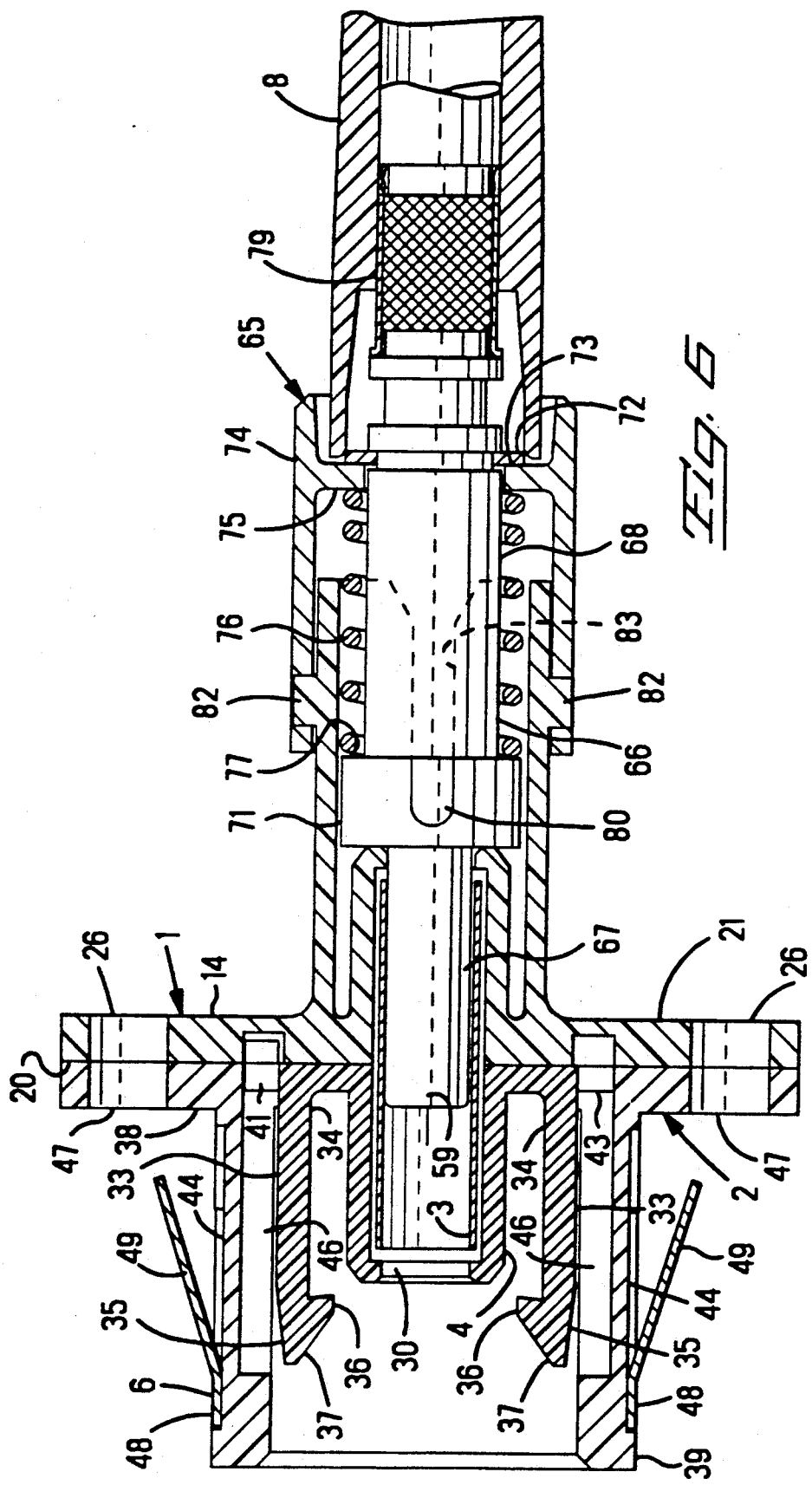
FIG. 6 is a view in section of the bayonet connector intermated with the coupling bushing as shown in FIG. 5.

Referring to FIGS. 4, 5 and 6, where elements corresponding to those in FIGS. 1, 2 and 3 are identified with identical numbers, is shown coupling bushing 1 with first half structure 1A and adapter assembly 2 comprising slotted sleeve 3, receptacle 4, receptacle housing 5, and clip 6. Also shown is strain relief boot 8. In the embodiment shown in FIGS. 3, 4 and 5, the connector is a bayonet connector 65. The connector 65 includes a rigid alignment ferrule 66 having a ceramic portion 67 and a metal portion 68. The ceramic portion 67 has an axial central passageway 69 for aligning the optical fiber 59 of the cable 58. A rear of the ceramic portion 67 is mounted into a socket 70 of the metal portion 68. The alignment ferrule 66 includes a radially enlarged collar 71 on the metal portion 68 and surrounding the ferrule 66.

The bayonet connector 65 further includes a snap ring 72 mounted in the groove 73, a coupling nut 74, moveable axially over the alignment ferrule 66, and having a transverse radially projecting inner flange 75. The nut 74 encircles the alignment ferrule 66 forward of the snap ring 72. Further included is a coil spring 76 directly in engagement against the rear face 77 of the collar 71, and for urging a force of compression against the inner flange 75. The coupling nut 74 has bayonet type slots 78 for connection with a known complimentary connector, not shown. Shown also is crimp ferrule 79 at the rear of the metal portion 68 of the alignment ferrule 66. Further shown are keying features 80 on collar 71 and j-slots 81 in the body of the coupling nut 74.

In this embodiment of the present invention, the first half structure 1A of coupling bushing 1 is characterized by barrel-shaped coupling body 17 with interior 18, the coupling body 17 further featuring latching nubs 82 on the outside surface of the barrel of body 17 and keying slots 83 in the rear portion of the barrel of body 17 for the accepting of keying features 80 of the bayonet connector 65 as hereinafter described.

Bayonet connector 65 is assembled according to the procedure described in Abendschein et al., U.S. Pat. No. 4,834,487, which description is incorporated herein by reference. The assembled bayonet connector 65 is then connected to the coupling bushing 1 including adapter assembly 2 by first inserting the forward end of the ceramic portion 67 of the bayonet connector 65 within the bore 16 and into sleeve 3 from the rear toward the forward face of the bushing 1 to abut a similar alignment ferrule within the bore 16 of socket 15. This similar alignment ferrule is not shown but may be any such ferrule of a connector such as a push-pull connector. In response to the abutment of the ceramic portion 67 to the alignment ferrule of the complementary connector, the collar 71 is moved within the coupling nut 74 to compress coil spring 76 to produce a spring bias to maintain the end of the ceramic portion 67 in the desired abutment. The collar 71 is moveable in and along the alignment ferrule 66 during retraction of the collar 71 into the coupling nut 74 to compress spring 76. The compressed spring 76 is then captured between inner flange 75 and collar 71 by advancing coupling nut 74 forward and by permitting latching nub 82 of the coupling body 17 to slide through the entryway of the j-slot 81. Then, the coupling nut 74 is rotated to permit the seating of latching nub 82 of coupling bushing 1 within the hook of the j-slot 81, thereby securing the coupling nut 74 and hence the bayonet connector 65 to the barrel-shaped coupling body 17 of the bushing 1. The resulting assembly may be interconnected with a push-pull type of connector.

Shown in FIGS. 7 and 8, is a coupling bushing 1 having a threaded barrel-shaped coupling bodies 17 and 17' for interconnection with threaded connectors 7. Further shown are first half structure 1A and second half structure 1A'. Second half structure 1A' is a complementary structure to first half structure 1A, and has complementary nubs 22', recesses 23', ridges 24' and slots 25', for intermating and interconnection to complementary nubs 22, recesses 23, ridges 24 and slots 25, with slotted sleeve 3 captivated within the bore 16' and aligned bore 16. The resulting dual threaded coupling bushing 1 provides means for intercoupling two threaded connectors 7 and 7', not shown.

Figure 9:
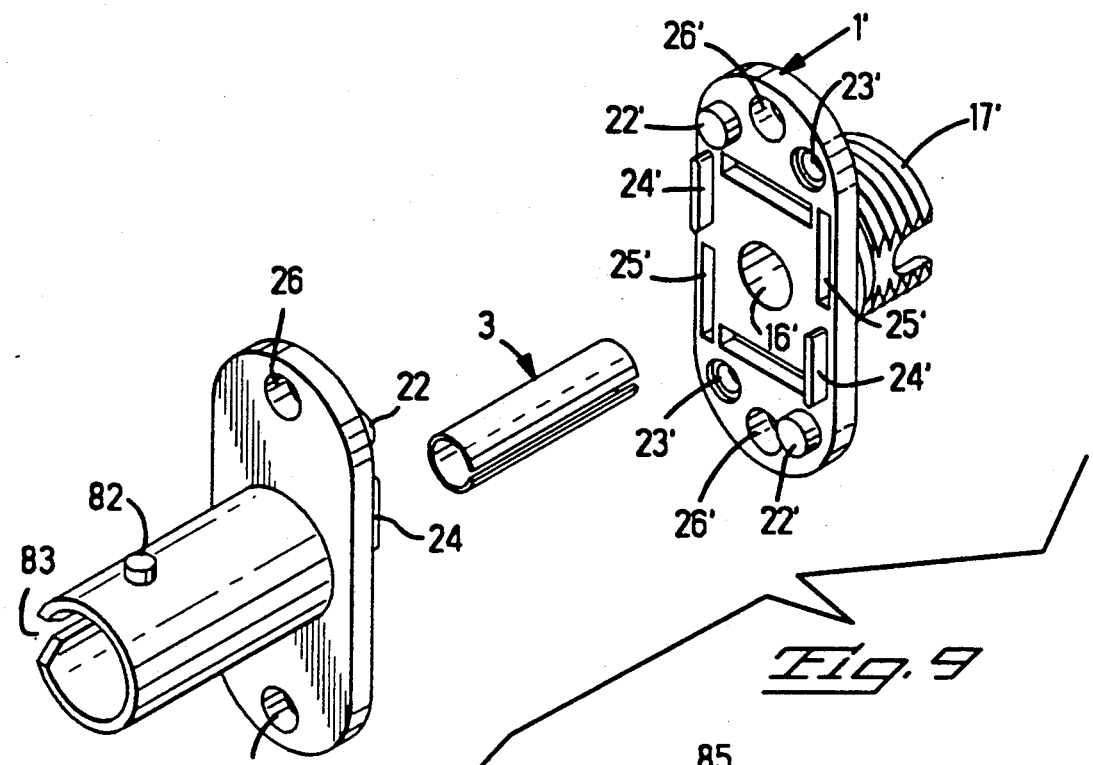
FIG. 9 is a perspective view, partially exploded, of a coupling bushing for bayonet connectors.
Figure 10:
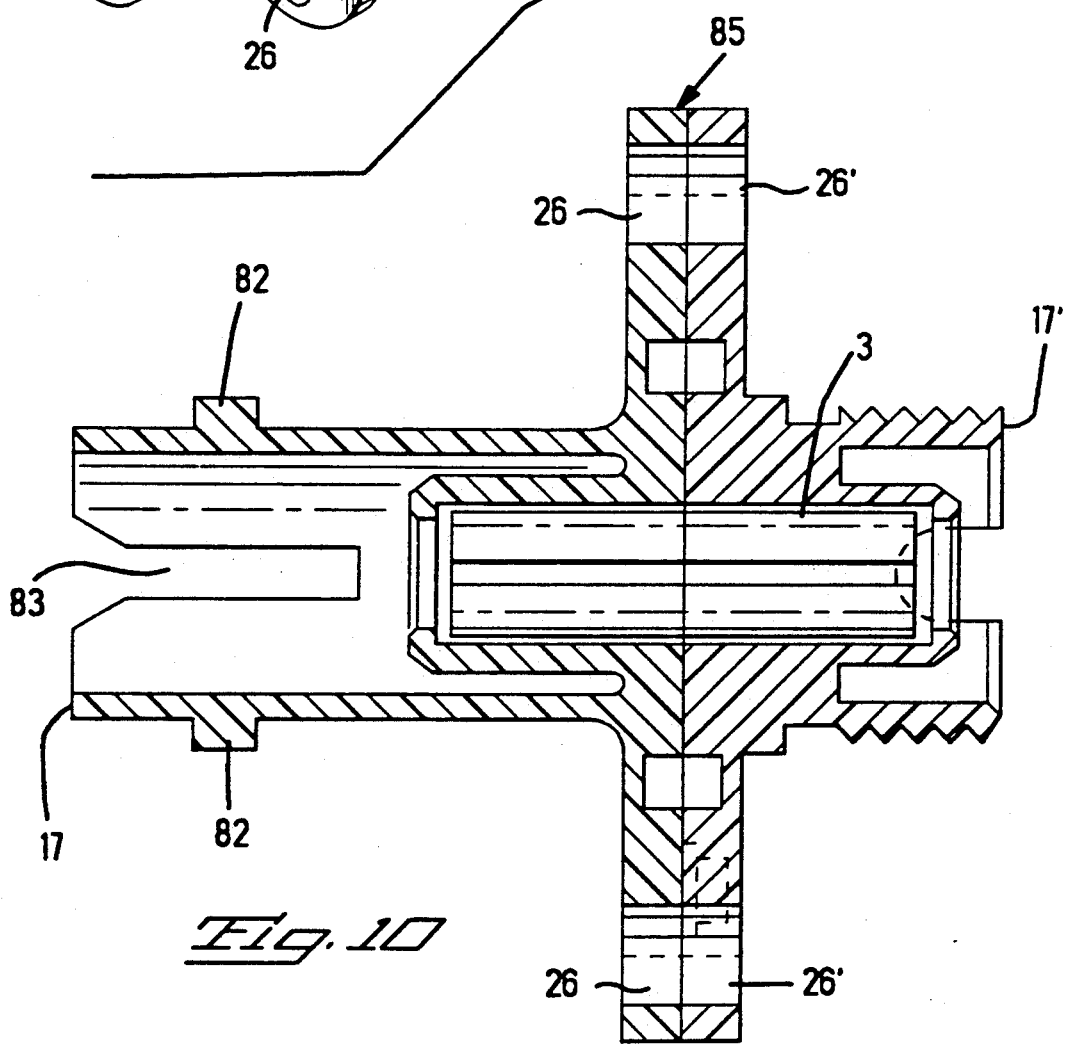
FIG. 10 is a view in section of the coupling bushing of FIG. 9.

FIGS. 9 and 10 show the interconnection of a coupling bushing 1 having a first half structure 1A with threaded barrel-shaped coupling body 17 for connection to a threaded connector 7, and second half structure 1A' with barrel-shaped coupling body 17 having latching nubs 82 and polarization slot 83. Again, nubs 22', recesses 23', ridges 24' and slots 25' of second half structure 1A' intermate with nubs 22, recesses 23, not shown, ridges 24, and slots 25, not shown, of first half structure 1A, and the bodies are secured, one to the other, by ultrasonics or the like. The resulting coupling bushing 1 provides means for interconnecting a threaded connector 7 to a bayonet connector 65.

Figure 11:
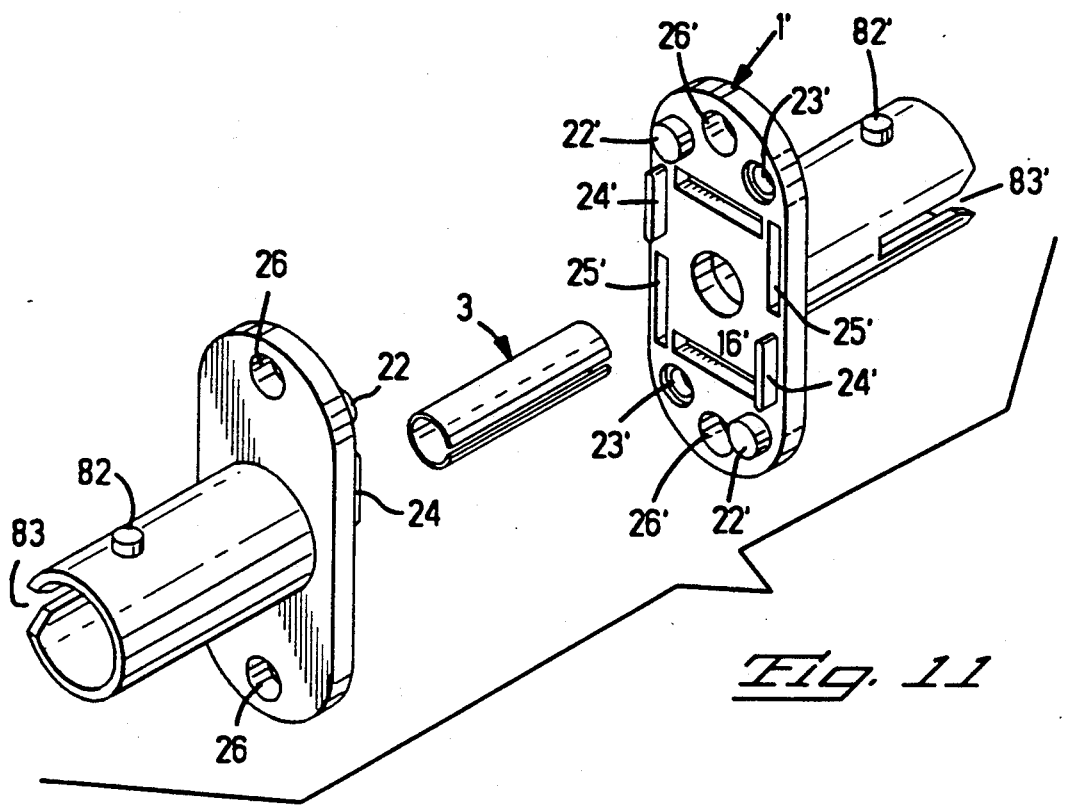
FIG. 11 is a perspective view, partially exploded, of a coupling bushing for a bayonet connector and a threaded connector.
Figure 12:
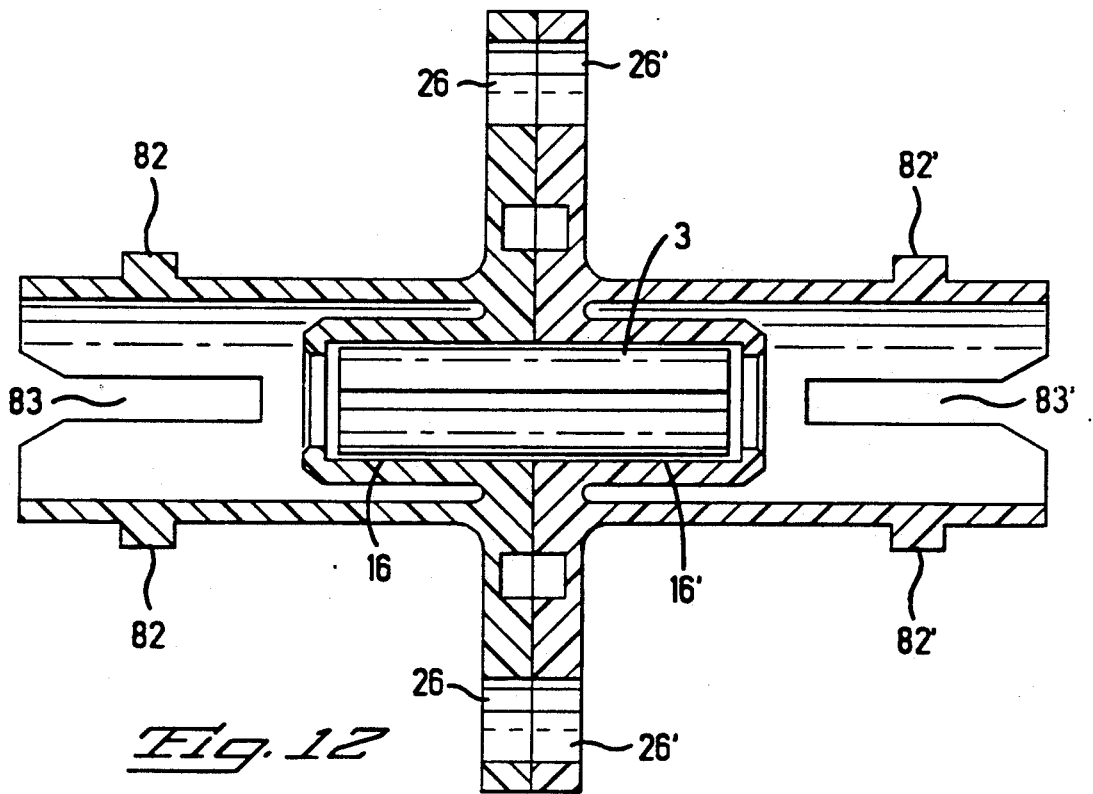
FIG. 12 is a view in section of the coupling bushing of FIG. 11.

With reference to FIGS. 11 and 12, is shown a coupling bushing 1 for interconnection of bayonet connectors, the first half structure 1A of the coupling bushing 1 having latching nubs 82 and keying slot 83. A complementary second half structure 1A' of the coupling bushing 1, has latching nubs 82' and keying slot 83', and may be secured to the first structure 1A by intermating of nubs 22', recesses 23', ridges 24' and slots 25' with the nubs 22, recesses 23, not shown, ridges 24 and slots 25, not shown. Again the bodies are secured, one to the other, by the application of ultrasonics or other means. Again, slotted sleeve 3 is captured within the commonly aligned bore 16' of bushing 1' and bore 16 of bushing 1. The resulting coupling bushing 1 in the form of a dual bayonet assembly provides means for interconnecting two bayonet connectors 65, one to the other.

While what has been described constitutes a presently preferred embodiment of the invention, it should be recognized that the coupling bushing 1 of the present invention may take numerous other forms. For example, included within the scope of this invention are duplex coupling bushings having half sections for connection of one duplex connector to another. Exemplary duplex connectors are disclose in Mulholland et al., U.S. patent application 491,755, still pending filed Mar. 9, 1990.

Further, as examples of other embodiments included within the scope of this invention and with reference to FIGS. 1, 2 and 3, the half structures may be interconnected to provide a coupling bushing 1 having keying slot 45 on the same side of the bushing 1 as keying slot 84. However by virtue of the aligning and orienting features as provided by the combinations of nubs, recesses, ridges and slots of the present invention, it is possible to rotate the half structures, one to the other, so that they may be interconnected to provide a coupling bushing having keying slot 45 on the opposite side to the side of barrel-shaped coupling body 17. Further, this observation that the half structures may be oriented in two respects to provide two different relationships of keying slots, is true with respect to the combinations of half structures of FIGS. 4 through 12 as well. In each case, the half structures may be interconnected to provide keying features on the same side of the bushing 1 or on opposite sides of the bushing 1.

Further as example of other embodiments included within the scope of this application, the barrel-shaped coupling body 17 may be adapted to accommodate other types of connectors so long as the coupling bushing 1 is characterized by a socket passing through its base and forming an axially passageway and adapted to receive an alignment ferrule of the optical fiber connector, and further, so long as the base is characterized at its front face by a pattern of ridges and slots and by at least one recess and at least one nub forming alignment features. Accordingly, it should be understood that the invention is to be limited only in so far as required by the scope of the following claims.

We claim:

1. A coupling busing for an optical fiber connector, the connector including a central passageway, an alignment ferrule, and an optical fiber, the coupling busing comprising a half structure, said half structure comprising:
   a base having a profiled axial bore;
   a socket extending from a rear of the base and having a bore axially aligned with the bore of the base to form an extension thereof and adapted to receive an alignment ferrule of said optical fiber connector;
   at a front face of the half structure, a pattern of ridges and slots forming a keying feature for intermating with a complementary feature of another connecting base;
   at least one recess and at least one nub forming aligning and orienting features for intermating with complementary aligning and orientation features of the connecting base; and
   a barrel-shaped coupling body extending from a rear face at the rear of said base and encompassing the socket within an interior of the socket, said interior being adapted to receive an end of the optical fiber connector.

2. The coupling bushing of claim 1 wherein said barrel-shaped housing is threaded at its outer surface for intermating with a threaded type of optical fiber connector.

3. The coupling bushing of claim 1 wherein said barrel-shaped housing has latching nub and slot for intermating with a bayonet type of optical fiber connector.

4. An intermated coupling bushing comprising a first half structure section and a second half structure, each according to the structure of claim 1, the first and second half structures intermated one to the other, front face to front face, by complementary fit of the pattern of ridges and slots of the first half structure to the pattern of ridges and slots of the second half structure, and further by complementary fit of at least one nub of one structure to the at least one recess of the other structure.

5. An intermated coupling bushing comprising a first half structure section and a second half structure, each according to the structure of claim 2, the first and second half structures intermated one to the other, front face to front face, by complementary fit of the pattern of ridges and slots of the first half structure to the pattern of ridges and slots of the second half structure, and further by complementary fit of at least one nub of one structure of the at least one recess of the other structure.

6. An intermated coupling bushing comprising a first half structure section and a second half structure, each according to the structure of claim 3, the first and second half structures intermated on to the other, front face to front face, by complementary fit of the pattern of ridges and slots of the first half structure to the pattern of ridges and slots of the second half structure, and further by complementary fit of at least one nub of one structure to the at least one recess of the other structure.

7. An intermated coupling bushing for optical fiber connectors, the connectors including central passageway, alignment ferrule and optical fiber; the coupling bushing comprising a first half structure according to claim 3 and a second half structure comprising a base having profiled axial bore, and a socket extending from the rear of said base and having bore axially aligned with the bore of the said base to form an extension thereof and adapted to receive an alignment ferrule of said optical fiber connector, the second half structure further comprising;
 at its front face, a pattern of ridges and slots forming a keying feature for intermating with complementary feature of another connecting base, and at least one recess and at least one nub forming aligning and orienting features for intermating with complementary features of said another connecting base, said second half structure further comprising;
 a barrel-shaped coupling body extending from a rear face of said base and encompassing the said socket within its interior which is adapted to receive an end of the optical fiber connector, said barrel-shaped housing being threaded at its outer surface for intermating with a threaded type of optical fiber connector;
 the first and second half structure intermated one to the other, front face to front face, by complementary fit of the pattern of ridges and slots of the first structure to the pattern of ridges and slots of the second structure, and further by complementary fit of at least one nub of one half structure to the at least one recess of the other half structure.

8. A coupling busing for an optical fiber connector, the connector including a central passageway, an alignment ferrule, and an optical fiber, the coupling bushing comprising a half structure, said half structure comprising:
 a base having a profiled axial bore;
 a socket extending from a rear of the base and having a bore axially aligned with the bore of the base to form an extension thereof and adapted to receive an alignment ferrule of said optical fiber connector;
 at a front face of the half structure, a pattern of ridges and slots forming a keying feature for intermating with a complementary features of another connecting base;
 at least one recess and at least one nub forming aligning and orienting features for intermating with complementary aligning and orienting features of the connecting base; and
 a receptacle housing having a receptacle thereon, said receptacle having two catch pieces of cantilever form extending from the base parallel to and an opposing sides of a longitudinal axis of the socket of said base and terminating in protrusions and lip structures for intermating with a push-pull type of optical fiber connector.

9. An intermated coupling bushing comprising a first half structure section and a second half structure, each according to the structure of claim 8, the first and second half structures intermated one to the other, front face to front face, by complementary fit of the pattern of ridges and slots of the first half structure to the pattern of ridges and slots of the second half structure, and further by complementary fit of at least one nub of one structure to the at least one recess of the other structure.

10. An intermated coupling bushing comprising a first half structure section and a second half structure, each according to the structure of claim 8, the first and second half structures intermated one to the other, front face to front face, by complementary fit of the pattern of ridges and slots of the first half structure to the pattern of ridges and slots of the second half structure, and further by complementary fit of at least one nub of one structure to the at least one recess of the other structure.

11. An intermated coupling bushing for optical fiber connectors, the connectors including central passageway, alignment ferrule and optical fiber; the coupling busing comprising a first half structure according to claim 8 and a second half structure comprising a base having profiled axial bore, and a socket extending from the rear of said base and having bore axially aligned with the bore of the said base to form an extension thereof and adapted to receive an alignment ferrule of said optical fiber connector, the second half structure further comprising:
 at its front face, a pattern of ridges and slots forming a keying feature for intermating with complementary feature of another connecting base, and at least one recess and at least one nub forming aligning features for intermating with complementary features of said another connecting base, said second half structure further comprising:
 a barrel-shaped coupling body extending from a rear face of said base and encompassing the said socket within its interior which is adapted to receive an end of the optical fiber connector, said barrel-shaped housing having latching nub and slot for intermating with a bayonet type of optical fiber connector;
 the first and second half structures intermated one to the other, front face to front face, by complementary fit of the pattern of ridges and slots of the first structure to the pattern of ridges and slots of the second structure, and further by complementary fit of at least one nub of one half structure to the at least one recess of the other half structure.

12. An intermated coupling bushing according to claim 9, 4, 5, 6, 10, 7, or 11, wherein said sockets of the said intermated half structures define a common axial bore and wherein said bushing further includes a sleeve for receiving the alignment ferrule of the connector and said sleeve captivated within the said common axial bore of the sockets.

* * * * *